May 12, 1936.    J. BIJUR    2,040,076
CENTRALIZED LUBRICATION
Filed Dec. 10, 1929    3 Sheets-Sheet 1

INVENTOR
Joseph Bijur
BY
Dean, Fairbank, Obright & Hirsch.
his ATTORNEYS

May 12, 1936.  J. BIJUR  2,040,076

CENTRALIZED LUBRICATION

Filed Dec. 10, 1929  3 Sheets-Sheet 3

INVENTOR
Joseph Bijur
BY
Dean, Fairbank, Obrieghter Hirsch
his ATTORNEYS.

Patented May 12, 1936

2,040,076

UNITED STATES PATENT OFFICE 2,040,076

CENTRALIZED LUBRICATION

Joseph Bijur, New York, N. Y., assignor to Auto Research Corporation, a corporation of Delaware Application December 10, 1929, Serial No. 412,982

85 Claims. (Cl. 184—7)

My present invention relates primarily to centralized systems for distributing lubricating oil to various bearings of a mechanism such as an automobile.

An object of the invention is to provide a chassis lubricating system to function automatically as long as the engine is in operative condition and without any attention whatsoever, not even the charging of a tank or the manipulation of a valve or handle or any adjusting or other manual operation, in order to initiate or maintain operativeness.

Another object is to propel lubricant for the chassis bearings by the use of pressure mechanism already present on the vehicle for other purposes, and to meter the lubricant for correct feed to various chassis bearings under all conditions of operation, all without the use of moving parts or mechanism.

Another object is to provide an installation of the above type by which any of a wide range of oils including ordinary crank case oil may be delivered continuously under pressure throughout the operation of the vehicle, substantially at the extremely slow rate required by the chassis bearings thereof, yet without the likelihood of clogging the flow passages under the extremely slow rate of feed.

Another object is to feed lubricant to the chassis bearings continuously from the oil sump of the engine crank case by the propulsive force of the engine oil pump, without impairment of the efficacy of engine lubrication or the possibility of drainage of the sump even in the event of a break in the chassis line, and without the need for frequent renewal or cleansing of filters.

Another object is reliably to accomplish the extremely slow yet diverse rates of feed to the several bearings, required in a continuous feed system of the above type, without resort to extremely accurately proportioned, highly restricted, calibrated restrictions, and more particularly to render feasible the use for such purpose, of drip plugs of the general character and range of resistance, but of construction even cheaper and less bulky than that disclosed in my prior Patent No. 1,632,772.

Another object is to provide a system of the above type in which the rate of feed remains satisfactory at all times, even though the viscosity of the oil in the distributing pipes vary greatly throughout the range of temperatures of use.

Another object is to provide an installation of the above type which does not involve parts that take up space on the dashboard, instrument board or other vehicle portion ordinarily used for instruments or operating devices, and which requires no special filling opening and no special indicator or alarm to give notice of need for refilling.

Another object is to provide a system of the above type of extremely simple and inexpensive construction, the various parts of which may be readily manufactured in quantity production.

Another object is to provide a control device of the above type, which can be readily taken apart for cleaning or replacement of the filter element thereof and which is absolutely proof against error in re-assembly, and which inherently guards against any interference with the operation of the engine lubricating system should any element of the unit be omitted from the assembly.

In the specific application of the invention to feed of lubricant from the engine oil pump to the chassis bearings of an automobile, the difficulty arises that while the viscosity of the hot engine oil coursing through the engine bearings varies but little during the limits of summer and winter use, that in the chassis lines may be more than fifty times as viscous in cold weather as in hot. Consequently an engine oil pump regulated for substantially constant pressure would feed far too little oil to the chassis in winter, assuming it to feed correctly in summer.

A feature of the invention is the provision in a system of the above type, especially one having flow restricting outlet branches, of an automatic master regulator device through which the pump feeds to the line. The regulator is constructed and arranged, in itself approximately to determine the rate of feed from the pump to the outlets fed from said regulator, thus obviating the great fall in rate of feed that would otherwise occur in the cold.

Another feature is to dispose the master regulator device at a part of or associated with the vehicle or other mechanism, where there is a less variation of temperature than at the bearings or drip plug outlets that are exposed to the weather, so that the master flow regulator device will not be subject to the wide variations in retarding effect incurred at the restrictions of the distributing line.

The master regulator would preferably be disposed where reasonable constancy of temperature is maintained throughout the seasons. If temperature variations are unavoidable, the master regulator would be disposed at a region of relatively higher temperature where such variations have a relatively small effect on the viscosity of the oil, in the case of a chassis lubricating system, preferably at the water jacket or crank case.

In a preferred embodiment the master regulator device is essentially a flow restriction or fixed throttle devoid of mechanism, and imposing a resistance considerably higher than that of any of the flow proportioning restrictions or drip plugs in the branches of the distributing line. In a preferred compact construction, the master regulator involves a plug applied in a corresponding aperture in the water jacket or other warm engine part. The master plug may have one or more pins fitting fairly snugly in corresponding bores to afford the controlling restriction. Each master regulator or plug is preferably marked to show its predetermined invariant rating, the lubricating system of each automobile chassis or other machine being equipped with a master plug of rating appropriate to its requirements.

Inasmuch as the oil from the engine sump, which is used in a preferred commercial embodiment of the system usually has solid impurities, means is provided to intercept such solids before they can reach the restricting element of the master unit. In a preferred embodiment, a dirt interceptor is provided in the course of flow of engine oil and may be included in the regulator assembly. The interceptor may comprise a filter, which may be of compressed wool felt to arrest even very small particles. The filter may be cylindrical in form, thereby affording within the confines of a small volume, a large area which will remain effective for a long period of use without becoming clogged. The filter may be associated with a settling chamber, to the bottom of which sediment tends to settle out, allowing only the cleaner oil at the top to pass into the filter from which the master regulator receives the oil to be passed on to the distributing system.

In the accompanying drawings in which are shown one or more of the various possible embodiments of the several features of the invention.

Figures 1, 2, 3, 4:
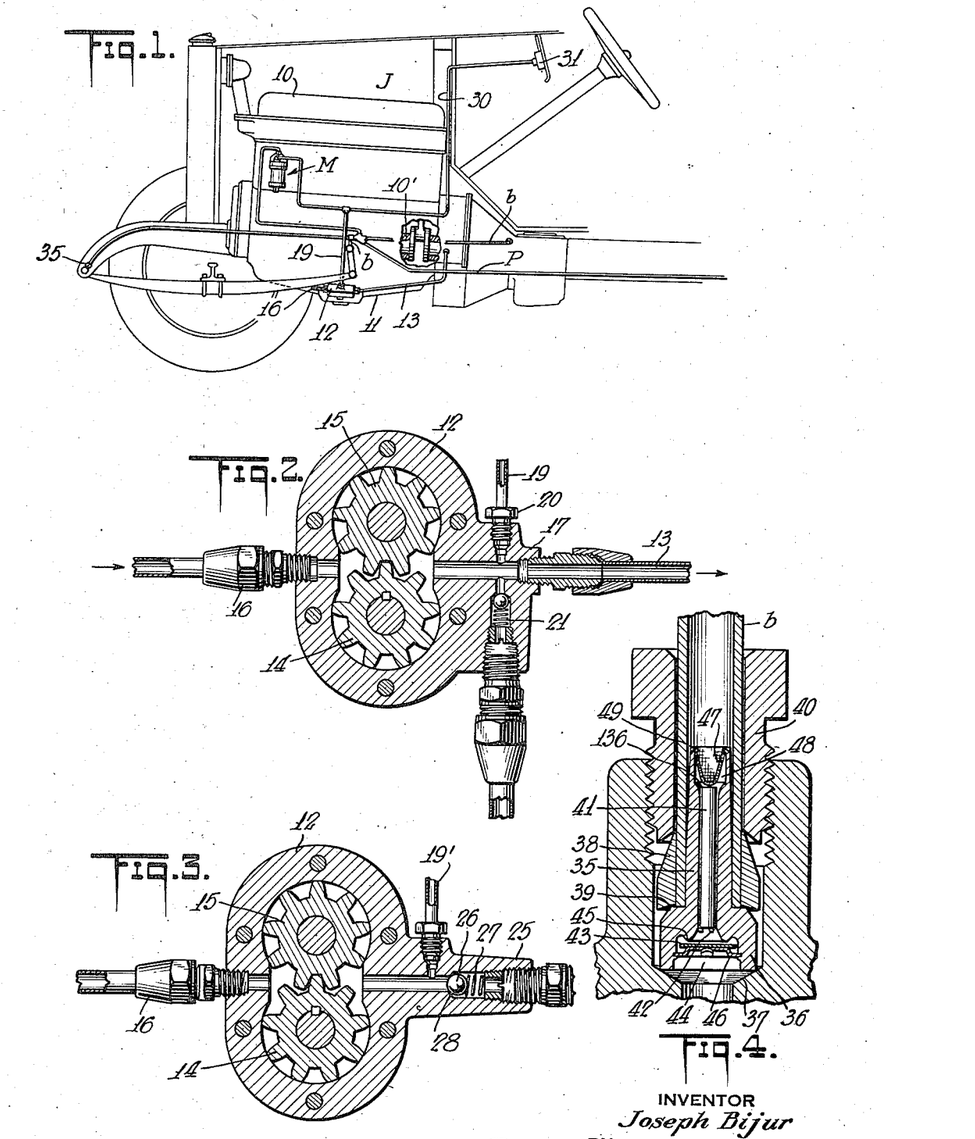
Fig. 1 is a side elevation of an automobile with parts broken away indicating diagrammatically parts of the lubricating installation.
Fig. 2 is a view in longitudinal cross-section showing the details of the construction of the gear pump used, where the engine lubricating system is of the high pressure type.
Fig. 3 is a view similar to Fig. 2 of gear pump used where the engine lubricating system is of the low pressure type.
Fig. 4 is a longitudinal cross-section through a preferred form of drip plug.

Referring now to Fig. 1 of the drawings, there is shown a fragment of a motor vehicle including an engine 10 having an oil containing sump 11 in which is the engine oil pump 12 which in the high pressure embodiment shown in Fig. 2 forces lubricant through conduit 13 to the bearings of the crank shaft 10' and to other engine bearings. The pump 12 may be of the usual type comprising intermeshing gears 14 and 15, an inlet 16 from the crank case and an outlet 17 leading to the conduit 13. Lubricant is fed from pump 12 to the chassis system through a conduit 19 connected by bushing 20 to pump 12 at a part thereof between the gears and the safety or blow off valve 21 that drains back to the crank case.

Another type of engine lubricating system involves a conventional gear pump which, however, does not feed by pressure to the bearings, but merely elevates the oil to collecting troughs, from which it is allowed to drain by gravity flow to various engine bearings. Inasmuch as but insignificant pressure is evolved by the pump when operating on an open system of this type, such pump is arranged to apply the effective sustained pressure desired at the inlet to the chassis lubricating system by providing in the pump outlet 25 that leads to the splash trough (see Fig. 3) a loading valve 26 urged by a coil spring 27 against seat 28.

In operation, the pump must evolve sufficient pressure to unseat loading valve 26 in order to feed lubricant for the splash trough as required, the pressure determined by the loading valve being also applied to the inlet 19' of the chassis lubricating system.

It is also preferred to connect in advance of the loading valve, a conduit 30 leading to a gauge 31 at the dashboard. The gauge will, therefore, indicate by a positive high pressure reading, as long as the low pressure engine lubricating system is in operation.

For each of the pump arrangements of Figs. 2 and 3 described, the chassis lubricating system derives its supply from the pump outlet through pipes 19 and 19' respectively, each disposed between the gears of the pump and the outlet to the engine bearings. Pipes 19 and 19' lead to au automatic master control unit M to be hereinafter described, from which the lubricant distributing system in turn is supplied. The distributing system comprises preferably seamless piping p of small bore, leading along the chassis frame and other parts and having outlet branches b affixed to deliver to the various chassis bearings a few only of which are shown.

Each of the branches is preferably equipped with a flow resistance or obstruction, calibrated to the diverse proportional requirements of the several bearings. The entire or a substantial part of the length of each branch may be conformed or plugged to constitute the flow resistance or obstruction fitting, but in a preferred embodiment, such fitting comprises a drip plug at or adjacent to the outlet end of each branch. The drip plug may be of any of various possible constructions, examples of which are disclosed in my prior Patent No. 1,632,772 of June 14, 1927 and in the prior British patent to Auto Research Corporation No. 261,967 of March 13, 1926.

A specific construction particularly useful in the present relation is shown in Fig. 4 and is quite similar to the disclosure of the prior British patent referred to. The construction need be described but briefly, as it is claimed herein only in combination as a constituent part of the system as a whole.

The drip plug comprises a cartridge unit 35 having an enlarged head 36 abutting at its edge against the bevelled bottom 37 of the bearing socket. The shank of the cartridge of reduced diameter is encircled by the end of the feed pipe b which abuts against the head and is clamped against said shank by a compression coupling comprising a tapered coupling sleeve 38 having a milled convex end 39 pressed against the head of the cartridge by the inner end of a bushing 40. The bushing 40 encircling the pipe, is threaded into the socket and forces the edge of the coupling sleeve 38 inward against the pipe b to clamp the latter against the cartridge shank 35.

The cartridge has a longitudinal bore of accurately predetermined diameter, housing a pin 41 also of accurately predetermined diameter, which determines a crevice of definite resistance to flow under a given pressure. The resistance or rating of the cartridge will depend on the diameter of the pin and the rating will preferably be marked upon the cartridge. The pin is maintained in place within its bore by staking the cartridge as at 42 at the lower extremity of the pin.

Preferably a flap disk valve 43 is disposed in an axial socket 44 within the head of the cartridge and coacts with an annular seat 45 formed in said head and is limited in its displacement from said seat by a closure cap 46 sprung in place within the head.

The closure cap 46 serves as a valve retainer and is provided with cruciform embossment, the central portion of which is provided with an outlet opening.

A protective strainer 47 is disposed in a corresponding enlargement 48 at the inlet end of the cartridge. This strainer may comprise a conically shaped area of wire mesh having its reduced end toward the head of the pin and its rim trapped under an inturned bead 49 at the extremity of the cartridge.

The master control unit M through which the oil pump feeds to the chassis lubricating system usually presents a resistance to flow of order higher than that imposed by the distributing system or by any drip plug thereof.

In a preferred embodiment, the master regulator comprises a master restriction unit of very high resistance and associated protective means serves to intercept any solid particles entrained with the oil toward the restriction unit from the crank case.

Figures 5, 6:
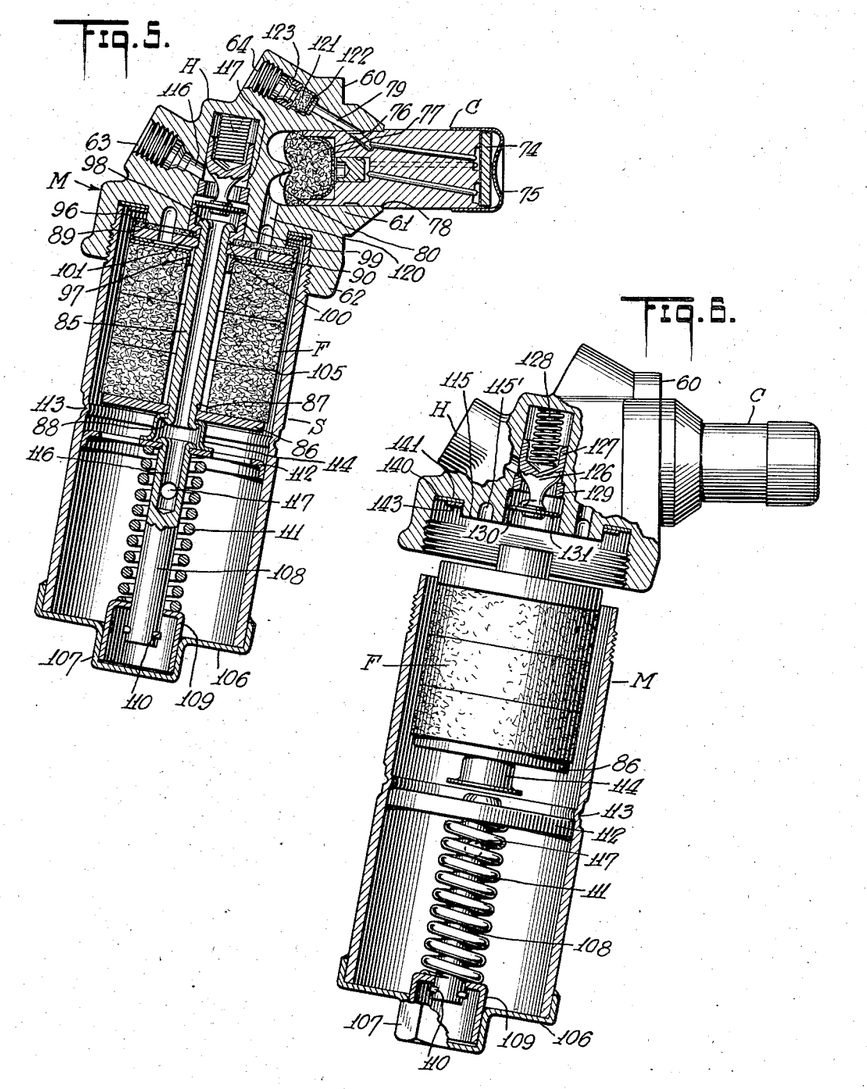
Fig. 5 is a view in longitudinal cross-section through the master control element.
Fig. 6 is an exploded view partly in section of the master control element.

The dirt-protected regulator is shown in an embodiment which includes a restriction unit C, and a protective oil cleansing unit S illustratively shown mounted on a common carrying head H. The head H is preferably provided with a flange 60 by which it may be bolted against the water jacket or other hot part of the engine. The restriction unit or cartridge C preferably protrudes from socket 61 in the head to extend into the water jacket to be maintained heated thereby, and the oil cleansing unit S is affixed to depend from a downwardly extending flange 62 in the head.

The head has an inlet socket 63 through which oil passes to the protective unit, from which the oil passes on its way to and through the restriction cartridge C for exit through the outlet socket 64 of the head, all as will appear more fully below.

Figure 7:
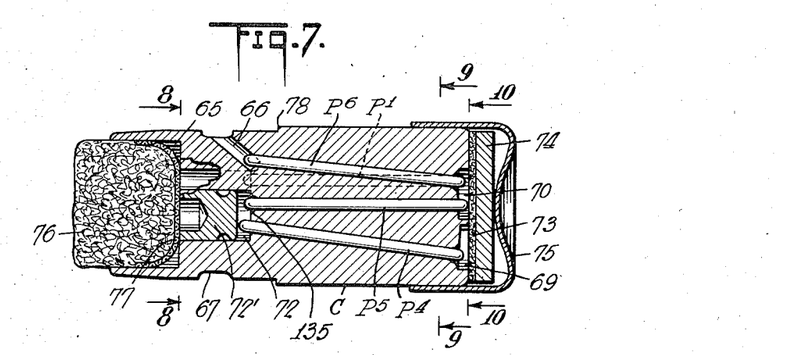
Fig. 7 is a view in longitudinal section and on a larger scale showing the control cartridge of the unit of Figs. 5 and 6, Figs. 8, 9 and 10 are transverse sections taken respectively on lines 8—8, 9—9 and 10—10 of Fig. 7.
Figure 8:
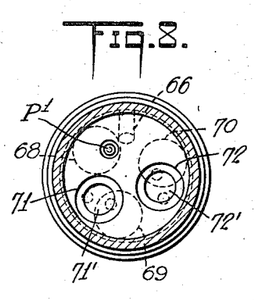
Figure 9:
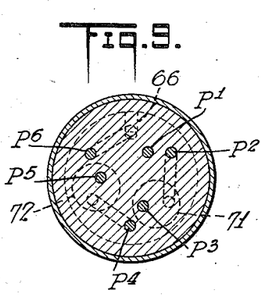
Figure 10:
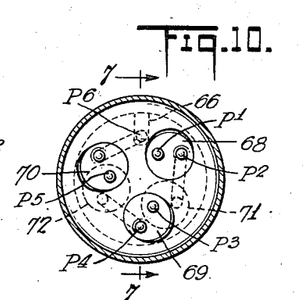

In a preferred specific embodiment, the master restriction unit C comprises a metal cartridge having a controlling flow passage therethrough of high flow resistance. A desirable restriction or resistance is shown, in which resort is had to substantially the same principle used in the drip plug, modified however, to provide a length of restriction crevice several times that of the cartridge, so that a high order of flow resistance is accomplished by multiplied length of a restriction passage no finer than that of one of the drip plugs of Fig. 4. The illustrated embodiment shows a plurality, in this case six, restriction pins, extending longitudinally of the plug, to afford a very long restricted passage, extending back and forth lengthwise of the plug, along the pins in series, each pin as well as the restricted passage determined thereby being designated by a reference character P with successive subscripts 1 to 6 for the successive pin restricted passages. In the illustrative embodiment shown, the inlet pin P', extends in a longitudinal bore communicating with the socket 65 at the inlet end of the cartridge, the extreme or outlet pin $P_6$ in oblique bore communicating with a short oblique lateral outlet bore 66 which delivers to a peripheral groove 67 about the cartridge. The four intervening restriction passages extend longitudinally of the plug and communicate successively with each other at depressions 68, 69 and 70 at the outer end of the cartridge and at deeper sockets 71 and 72 closed fluid tight by friction fitted plugs 71', 72' at the inlet end of the plug. In particular the restricted passage $P_2$ communicates with socket 71 from which passage $P_3$ is fed and leads to depressions 69 which, in turn, supplies passage $P_4$ that leads to socket 72 from which passage $P_5$ delivers to depression 70 which in turn communicates with passage $P_6$ previously mentioned.

Each of the depressions 68, 69 and 70 in the outlet end of the plug is individually sealed except for the pin-restricted inlet and outlet thereof by a flat imperforate piece of gasket material 73 common to all said depressions and preferably pressed snug against the flat face or end of the cartridge by means of a heavy disk of metal 74 held thereagainst by a friction fitted cup 75 telescoped over the outer end of the cartridge.

The inlet end of the cartridge unit is protected from entry of solid particles by means of a plug 76 of dense wool felt backed by a rounded cup 77 of fine wire mesh.

The cartridge C is preferably friction-fitted into corresponding socket 61 in the mounting head and has a shoulder 78 affording an abutment stop against said head. When thus positioned the groove 67 registers with oblique outlet bore 79 of the head H. The head is provided with a unitary teat 80 which presses centrally against the outer end of the filter plug 76 and causes the latter to flare about the extremity of the cartridge, and thereby precludes packing of said plug against the end of the mounting socket.

Figure 11:
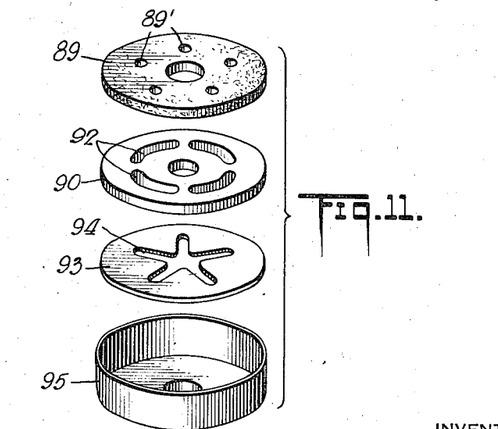
Fig. 11 is a dropped perspective view of the elements making up the bearing felt assembly of the filter of Figs. 5 and 6.

The combined filter and settling unit includes a removable filter unit F comprising a thick annular filter preferably of compacted wool felt. The filter is illustratively shown of three thick superposed disks of a commercial embodiment of such felt. The filter encircles a hollow mounting hub or spindle 85 to which it is assembled by means of a thick lower backing washer 86 of metal, abutting a shoulder 87 on the hub, the lower end of which is flared over, as shown at 88. At the upper end the filter unit has a bearing capsule, including a highly compacted felt disk 89 to engage the face of the head. This capsule is preassembled and comprises a metal backing disk 90 for the felt 89 having arcuate slots 92, a metal spacer disk 93 therebelow with slots 94 radiating from its center, upon which disk 90 and disk 89 are superposed, all said three elements confined in a sheet metal capsule 95 crimped over the rim of disk 89 at 96. The capsule has a downturned axial pilot 97 which extends into the upper filter disk F and clears the hub 85. The bearing felt assembly just described is assembled with the main filter assembly by flaring thereover at 98 the upper end of the hub or spindle 85, an interposed metal cup 99 having a pilot 100 extending into the central opening of disk 89, and a shoulder 101 pressed against the inner rim of felt disk 89.

The settling chamber S encloses the filter unit with peripheral clearance 105 and is releasably threaded at its upper end into the depending socket 62 and is closed at its lower end by a cap 106 preferably welded in place and equipped with a hexagonal extension 107 for convenient purchase of a wrench used in assembly and disassembly.

In order to retain the filter in operative relation, and to facilitate application thereof, the settling chamber is provided with an axial stem 108 slidably guided in an inverted cup 109 press-fitted into the wrench extension of cap 106 and limited against removal by stakes 110. A powerful coil spring 111 encircles the stem 108, its lower end reacts against cup 109 and its upper end against a perforated metal follower plate 112 which is limited in its upward movement by a peripheral indentation 113 in the shell S. The filter unit is provided with a small cup extension 114 retained in place against the disk 86 by the bead 88 and against the rim of this cup, the follower plate 112 exerts pressure to force the bearing felt 89 of the filter unit snugly against the flat face 115 of the head H.

The settling chamber S is thus a pre-assembled unit with its guide stem 108, spring 111 and follower plate 112 limited by indentation 113 from coming apart. The guide rod 108 is preferably axially bored at 116 and transversely bored at 117 through the axial bore for a purpose which will appear in the operation set forth below. For completing the assembly shown in Fig. 5 the filter unit would be inserted through the upper or open end of the settling cup S, and the rim of the latter would then be screwed into the socket 62. For the initial few turns of this operation, only slight effort is required, until the bearing felt 89 of the filter unit has contacted the face 115 of the head H. Thereafter, as the operation of screwing the cup in place is continued the thrust transmitted through the hub 85 of the filter unit will cause the follower plate 112 to be depressed, or rather the shell S will advance with respect thereto, thereby stressing the spring 111 to exert a pressure, which may be in the order of 100 pounds per square inch, against the filter unit, thus forcing the bearing felt 89 thereof tightly into engagement with the mounting socket base.

To afford an oil-tight seal between the rim of shell S and the head H, a gasket 140 is interposed. This is permanently retained against a circumferential depression 141 about the face of the head H by a metal washer 143 the latter in turn held in position by staking (not shown).

The oil is forced by the pressure of the pump through the inlet socket 63 of the unit, and proceeds by way of bore 116 and passage 117 axially of the head through the hub 85 of the filter unit into the oil filled settling chamber S therebelow. The flow proceeds upward into the annular space 105 about the filter, thence radially through the filter and upward along the exterior of hub 85 through capsule pilot 97 along the radial slots of plate 93 and through arcuate slots 92 of metal plate 90 and apertures 89' in felt bearing disk 89, to circular groove 115' in the base of the regulator head H. From this groove, the oil proceeds by way of bore 120 to the socket 61 for the cartridge C and is forced longitudinally through the successive restriction passages of the cartridge as previously described, to the outlet socket 64 of the head, which latter is connected to the distributing system. The outlet socket is preferably provided with a small felt disk 121 backed by a screen 122 of wire mesh and retained in place by a holding plug 123 which also serves as the re-action piece for a compression coupling, by which the inlet end of the distributing system is applied. The felt serves largely to protect the unit during handling prior to installation, from entry of solid particles to the restriction cartridge, also in case of reverse flow due to siphonic action while standing. The inlet pipe applied at socket 63 is larger in diameter than the outlet or distributing pipe applied at socket 64, so that reverse connection in installation is precluded.

As shown in Figs. 6 and 7 the shell and its mounting socket extend at an obtuse angle relative to the cartridge C and the mounting flange thereof, so that the unit may be conveniently applied to various standard makes of automobile engine, and the depending shell S may yet clear protuberances on the engine construction.

If desired, the cleansing device may be a unit separate and distinct from the control resistance, mounted at any suitable place such as the dashboard and connected with the control resistance by tubing.

The engine oil after use frequently develops microscopic black particles probably fine carbon or silica which when separated out have a black paint-like appearance. These particles are so very minute that even the highly compacted filter is ineffective to arrest them. They are not particularly objectionable in the lubricant. To avoid obstruction at the entrances to the respective pin passages of the control cartridge, which might occur due to the sudden change in direction of the course of oil flow with its entrained particles, it is preferred to round said inlets to the various bores as at 135 for instance, for gradual change of direction, so that these minute particles will pass through unimpeded. For the same reason, it is preferred similarly to round the inlets to the pin restricted passages of the drip plugs as at 136 in Fig. 4. The finely comminuted residue is thus allowed to pass through the system to the bearings.

Particles larger than the microscopic ones referred to, are, however, intercepted by the master control element, so that the strainers at the inlet ends of the drip plugs have only to intercept such chips or scale as may be initially in the piping and be entrained with the flow of oil to the bearings. For this purpose, the simple wire mesh 47 is ordinarily sufficient, although where sufficient cross-sectional area is available in the drip plug, the felt strainer plug of the prior patents alluded to may be employed.

With the device thus far described, installed as shown in Fig. 1, the engine oil pump operates quickly to fill up all of the crevices in the settling chamber S with engine oil. In the normal operation, the high resistance of the control cartridge and of the distributing system therebeyond cuts down the rate of feed so that throughout operation of the vehicle in normal use for a year, possibly not more than one gallon of engine oil will have passed through the regulator unit to the chassis. This constitutes feed at rate in the order of .10 c. c. per minute during running. Under such slow rate of normal feed, and while at rest, some of the solid particles in the oil would settle out into the settling chamber, the filter being required to abstract only the residue of entrained solid particles.

While the car is standing still for hours, say overnight, the entire oil filling the settling chamber below the filter unit F will have stratified and sediment will settle on the bottom, leaving relatively clear oil in the settling chamber immediately below filter F. Oil fed from the engine oil pump enters the settling chamber at the transverse hole 117 in stem 108 and relatively clear oil from thereabove is displaced to pass to the filter. Thus, the filter is not called upon the accommodate all or any very great fraction of the solids carried with the engine oil, but a substantial portion of this separates out in the settling chamber, whereby the life of the filter is prolonged. In fact, with a construction such as shown, in which the settling chamber shell S is about four inches long, and the other parts are in proportion as shown in the drawings, the vehicle can be operated for one year of normal running before the settling chamber and filter will have clogged to such extent as to make service necessary.

The settling chamber S being preferably of metal, is a good conductor of heat and its contents of oil during running of the engine is uniformly heated from the contiguous hot engine parts. At such high temperature the oil has relatively low viscosity, which facilitates settling of the solid content from the volume of oil in the chamber, said volume being substantially quiescent as the rate of feed therethrough is extremely slow, and by reason of its uniform temperature, it is undisturbed by convection currents. Preferably the rate of oil feed through the chamber S of relatively large diameter, effects an upflow which is slower than and, therefore, does not offset the settling of solids from the oil in said chamber.

The bearing filter end of the filter unit is so tightly pressed by the action of spring 111 against the filter head that there is no crevice left for unfiltered oil from about the exterior of the filter to pass into the control cartridge C. The bearing filter disk 89 is itself a dense filter, so that any oil that might be forced through said bearing capsule would be effectively filtered.

In order to restore the control unit to operativeness when after long operation, service is required, it is merely necessary to unscrew the shell S by means of a wrench, whereupon the filter assembly F may be taken out for cleaning or preferably for replacement with a substitute filter unit.

The metal shell is then washed out with kerosene or gasoline to remove the viscous black residue therein. The parts are reassembled then, in the manner previously described for original assembly.

In order to guard against incorrect application of the filter unit in upside-down position, the guide cup 99 at the upper or inner end of the filter unit is made smaller in diameter than the reaction cup 114 at the lower end thereof. Consequently were it attempted to insert the filter in upside-down position, the cup would not enter the passage in the head and the assembly could not be completed.

Another safeguard is provided to avoid serious consequences due to eventual omission of the shell S or of the filter unit F from the original or from the serviced assembly. Were such shell omitted the engine pump would promptly drain the crank case with serious consequences. Were such shell applied but the filter omitted, the entire lubricant distributing system might soon be deranged due to the entraining of solid particles of metal, carbon and the like from the engine sump into the chassis lines and to the drip plugs. In order to avoid such difficulties, means is provided, automatically to shut off communication from the engine lubricating system to the chassis distributing system in either of these contingencies, so that no emission at the chassis lubricating elements, can in any way jeopardize the engine lubricating system, nor can such omission bring about clogging of the chassis lubricating parts by dirty engine oil.

The preferred safeguarding means for the latter purpose is a valve 126 in the regulator head, having a globular seating conformation 126 and a skirt 127 guided in the upper socket end of passage 117 and urged by a coil spring 128 against valve seat ring 129 press-fitted into place as shown. Riveted to an extension shank 130 of the valve is an elongated cross strip 131, the ends of which strip are abutted by the upper end of cup 99 to unseat the valve when the filter is correctly in place. Omission of the filter from the assembly permits spring 128 to seat the valve and thereby prevents flow therebeyond to the settling chamber or to the resistance cartridge or to the chassis lines.

In the operation of an automobile equipped with the specific system described, the feed to the chassis bearings in no way affects the efficacy of the engine oil pump whether of the embodiment shown in Fig. 2 or Fig. 3, in the supply of oil to the engine bearings. Simultaneously with engine lubrication, the pump will continuously feed oil through the conduit 19 or 19' at the minute relatively infinitesimal rate resulting from the high resistance imposed by the control cartridge C superadded by the smaller yet generally substantial resistance of the chassis distributing line with its drip plugs.

The restriction of the control cartridge being, in the embodiment illustratively shown, of length equal to the combined lengths of the six pins $P_1$—$P_6$ it is far longer than that of the drip plug of Fig. 4. The cross-sectional area of the restriction is preferably coarser than that of a highly restricted drip plug, that is of one feeding but .10 cc. of 500 vis. per minute under a pressure of 25 lbs. per square inch. As compared with the distributing system in its entirety which may have five, ten or more drip plugs in parallel, each of flow resistance generally considerably less than that of the most finely restricted one, the resistance imposed by the control cartridge to oil of the same viscosity may be three hundred fold or more than that of the entire distributing system therebeyond, passing the same oil through both at the same temperature, and even at the high temperature of the water jacket, the resistance imposed by the control cartridge may be 50 to 100 times that of the entire distributing system under conditions of normal summer driving. The distributing line functions in the manner well understood, each drip plug passing that proportion of the supply admitted to the line which is determined by its resistance relative to each of the other drip plugs.

Assuming the oil feed then to be approximately correct in summer operation with engine oil, the flow resistance of the cartridge C at that temperature illustratively being one hundred times as great as that of the chassis line, then in winter, the oil in the cold chassis lines becomes much thicker, say fifty times as viscous, while the restriction of the control cartridge at the hot water jacket will still have approximately the same resistance. Accordingly the total resistance of the entire line including the control cartridge and the distributing system in series therewith has only increased 50% notwithstanding the fact that the resistance of the chassis element has multiplied fifty fold. Accordingly, the rate of feed to the chassis line from the pump of nearly constant pressure, assuming the same oil to be used summer and winter, has only been cut one-third. In many cases it would be satisfactory to arrange the parts for slight over-lubrication in summer, which would not be serious, thereby obtaining lesser, yet sufficient lubrication in winter. Even this precaution is not usually necessary in view of the common practice of changing to a lighter engine oil when the weather becomes cold, so that even the small reduction in rate otherwise occurring due to cold with the use of the system described, would be compensated for.

As it happens, the characteristics of the ordinary engine oil pump and the relative levels of chassis bearings on a modern automobile are so correlated as to be peculiarly suited for practical use of the system described.

The maximum difference in level between chassis bearings is ordinarily not more than four inches. With drip plugs at that difference in level it will be apparent that the minimum pressure that would assure oil feed to the highest of the drip plugs should be at least four ounces or ¼ pound, this being more than sufficient to overcome the maximum difference in head between drip plugs. In winter than with the oil fifty times as viscous the propulsive pressure to produce corresponding rate of flow through the distributing system should be around 12½ pounds. Since the engine oil pump on ordinary automobiles generates pressure in the neighborhood of twenty-five pounds per square inch, substantially the desired relation will exist. In winter, when the resistance of the chassis line approximately equals that of the master plug 12½ pounds pressure drop will be taken by the latter leaving 12½ pounds available for the chassis line, while in summer on the other hand 24¾ pounds of the available pressure will be taken by the master plug leaving ¼ pound to propel the now fluid oil through the chassis lines, in each case giving the bearings approximately the feed that they require.

Even when the difference in level between bearings is considerably higher than four inches, necessitating a greater minimum pressure, the same is easily accomplished by the selection of restriction or drip plug outlets of sufficiently high resistance.

Frequently, it is desired to lubricate a fan bearing which is about a foot above the rest of the line from the central chassis system. The system above described, will deliver to the fan bearing at such times as the pressure in the line rises sufficiently, say to a pound or more, that is, when the weather is somewhat cooler or in the evenings. Occasional feed of this kind is feasible for the fan bearing, because unlike most other chasses bearings, the latter is generally equipped with a reservoir storing ample oil to tide it over between the warm spells when it may get less lubrication.

In the foregoing description, it has been assumed that the flow retarding effect of the master control unit is invariant and that changes in flow are due solely to change of temperature in the chassis lines therebeyond. As a matter of fact, however the hot water jacket or heated crank case where the master control unit is preferably disposed, is itself variable in temperature. There may be a range of 30 to 40 degrees in temperature between the extremes of summer and winter operation of the vehicle. The variation of viscosity at the range of water jacket temperature is however far less rapid than at the range of atmospheric temperatures, so that the effect of this cooling or increase of resistance in winter is only to reduce the rate of feed to the chassis somewhat. This is not objectionable since the oil is less liquid and more viscous in winter, and the oil pressure maintained by the pump is usually higher in winter than in summer, also the continuous feed of oil will afford adequate lubrication.

The suction seated valves 43 of the various drip plugs inhibit the leak while the vehicle is idle, of lubricant therefrom under the small differences of head that may exist therebetween. The engine at such time being cold and the oil therefore more viscous, the restricting effect of the high resistance control cartridge C is enhanced, so that drainage is practically impossible even if one or more of the suction-seated valves of the drip plug should become inoperative.

Should a break develop in the chassis line, the engine sump will not be drained, since the interposed resistance of the master plug even though the chassis line were completely disconnected therefrom, is so great that the oil would flow out at a rate but slightly greater than chassis bearing requirement.

The entire chassis distributing system including the master plug and the drip plugs, it will be seen, is devoid of any operating or moving parts that are apt to stick, jam or become deranged. It involves static flow resistances only, of dimension remaining invariant under changing pressure.

Solid particles carried by the engine oil are reliably intercepted in the shell S. The felt of the plug 76 is maintained from shedding hair by reason of the wire mesh cup 77 which mounts the same. The felt 121 at the outlet of the head is provided to prevent any small solid particles from entering therethrough in the handling of the master plug prior to installation thereof. This felt also prevents the entry of solid particles to the restriction passages by eventual reverse flow.

While ordinary engine oil could be used to advantage in the system, inasmuch as the large size cylindrical filter intercepts metal chips, carbon or other solid particles and prevents their admission into the master cartridge or into the pipe system therebeyond, it is nevertheless preferred to supply to the system crank case oil kept reasonably clean by an engine oil cleanser or purifier. Such arrangement has the advantage of further prolonging the period of usefulness of the filter unit, in many cases for the life of the vehicle.

It will be apparent that the air in the settling chamber is automatically expelled in normal operation since the oil entering the settling chamber displaces the air which rises and passes outward into the chassis lines and promptly escapes through the drip plug outlets.

If the unit of Fig. 5 were constructed and arranged to permit the trapping and compression of air therein, rather than to compel the automatic rejection as described, then the compressed air would tend to feed the oil back to the engine sump after the engine had stopped, instead of allowing it to remain in the settling chamber and the sediment would have less chance to separate out as previously described. Obviously the settling chamber could be made transparent, in whole or in part of glass, so that the settlement of sediment therein could be readily seen.

The use of the ordinary continuously operating engine oil pump that may produce a pressure in the order of 25 pounds per square inch, to feed a system involving drip plug outlets, the restriction clearances of which are such as to be within the range of facility for inexpensive large scale quantity production such as described in my prior Patent No. 1,632,772 would produce greatly excessive oil feed. By the simple interposition of the master control unit, proper feed is produced through a distributing system of the drip plug type as shown in my said prior patent, without on the one hand interfering with the proper pressure of the engine oil pump, or on the other hand, even with continuous feed necessitating drip plugs of such tremendously high, yet accurately proportioned resistance as to render their cost prohibitive.

Although my invention has a preferred application to the lubrication of chassis bearings from the same pump that supplies the engine oiling system, the invention from one aspect has a broader range of application. It is useful for the lubrication of a mechanism or installation in which some bearings (corresponding to those of the engine bearings) require flood oiling, and in which other bearings (corresponding to those of the chassis bearings) are to be simultaneously supplied by slow feed or drip all from a common source of pressure.

While from another aspect the invention has a preferred application to chassis lubrication and involves more particularly maintaining the high resistance master control unit at the water jacket or other heated part of the engine, the temperature variation of which is not very great, it will be understood that in this and in other relations in which the distributing system or outlets are subject to the effect of changing oil viscosity, the master control unit may be maintained at more or less predetermined temperature or range of temperatures by other arrangements suitable for said purpose.

I claim:

1. A fluid distributing system having a plurality of flow proportioning outlets and a flow throttling inlet to said system having a resistance to flow substantially greater than that of each outlet singly and of the entire distributing system therebeyond collectively.

2. A fluid distributing system having a plurality of flow proportioning outlets offering substantial resistance to assure emission through all of them under a given applied pressure, and a flow resistance near the inlet to said system substantially governing the total rate of inflow thereinto and having a resistance to flow substantially greater than that of each outlet singly and of the entire distributing system therebeyond collecively.

3. A lubricating installation comprising a distributing conduit system having highly restricted flow proportioning outlets to the bearings, a source of lubricant pressure having a flow delivering capacity greatly in excess of the requirements of the bearings, and an inlet to the distributing system of controlling resistance to flow to throttle down to the order of bearing requirements the feed of lubricant from said source through said inlet.

4. A lubricating installation comprising a pump exerting an approximately constant pressure and a distributing conduit system having outlet fittings of diverse invariant flow resistances adapted to the relative requirements of the bearings to be lubricated, and of character such as to be readily made in large quantity production, said fittings affording flow passages relatively so coarse as to permit greatly excessive flow under the pressure of said pump, and means interposed between the pump and the distributing system and of controlling resistance to flow, to throttle down to the order of bearing requirements the rate of lubricant feed from said pump to the distributing system.

5. A lubricant distributing system having flow proportioning outlets of the character which afford greater obstruction to the flow of lubricant with increasing viscosities, a source of substantially constant pressure, automatic flow regulating means between said source and said outlets to maintain approximate uniformity of feed rate which will afford an obstruction to the flow of lubricant substantially greater than the obstructions of said outlets and means to maintain said obstructing effect constant regardless of the varying viscosities of the lubricant passing through said outlets.

6. A chassis lubricating system comprising distributing piping having branched outlets, flow proportioning outlet fittings therein of resistance to flow high compared to that of the entire length of conduit leading thereto and a master control resistance at said inlet having a flow restriction several times as great as that of the entire system supplied therefrom.

7. A centralized lubricating system, including a pump continuously driven with the operation of the lubricated mechanism, a lubricant distributing system supplied from said pump and having outlet branches in parallel to the bearings, flow restriction means in said branches governing the proportionate flow to each bearing, and lubricant flow restriction means near the inlet to said distributing system substantially governing the rate of admission of lubricant to the distributing system under pressure applied by the pump.

8. In a centralized lubricating system, the combination of a source of lubricant pressure, a distributing conduit supplied therefrom and having outlet branches to various bearings, flow restriction units in said branches, of calibrated substantially invariant resistance to flow, and a control restriction unit near said pump passing the lubricant to the distributing system, said unit of resistance to flow of higher order than that of said outlets and of substantially fixed and invariant flow resistance.

9. An automatic continuous feed central chassis lubricating system, comprising a continuously operating pressure pump, a distributing system leading from said pump to the various bearings to be lubricated, flow restriction means in the outlet branches of said system proportioning the division of flow, a control element of predominating resistance to flow admitting the lubricant from the pump to the distributing system, the various flow controlling and proportioning elements of said system being of dimensions substantially invariant with changing lubricant pressures.

10. A fluid distributing system of the character described, having an inlet and in series therewith a plurality of outlets in parallel, flow restriction means in said various outlets governing the distribution of fluid therefrom and a flow restriction element at the inlet of said system of resistance to flow of order higher than that of said outlets, said system being constructed and arranged to remain substantially filled with fluid at all times.

11. A centralized lubricating system, including a pump driven during operation of the lubricated mechanism, a lubricant distributing system supplied from said pump and having outlet branches in parallel to the bearings, flow restriction means in said branches governing the proportionate flow to each bearing, flow restriction means near the inlet to said distributing system substantially governing the rate of admission of lubricant to the distributing system under pressure applied by the pump, and means to cause said distributing system to remain substantially filled with lubricant at all times, said flow restriction means in said branches affording a substantially greater restriction to the flow of lubricant than said distributing system and said bearings, whereby the restricting effect of said flow restriction means will have a predominating influence in proportioning the lubricant among said bearings and said flow restriction means near said inlet having a substantially greater restricting effect than said flow restriction means in said branches.

12. A centralized lubricating system including a pump driven during operation of the lubricated mechanism, a lubricant distributing system supplied from said pump and having outlet branches in parallel to various bearings at different levels, flow restriction outlet fittings at said branches and near said bearings governing the proportion of flow to each bearing, flow restriction means near the inlet to said distributing system substantially governing the rate of admission of lubricant to the distributing system under pressure applied by the pump, those of said outlet fittings at higher level having suction seated valves adapted to inhibit flow of lubricant to the lower bearings while the mechanism is at rest.

13. A chassis lubricating system for a motor vehicle comprising in combination with an engine sump having an oil pump therein, of a lubricant distributing system communicating with said pump and having restricted flow proportioning outlets emitting continuously under pump pressure to the bearings, and means in said system affording an outlet for the lubricant to the distributing system, substantially to retard the flow of lubricant under oil pressure, in the event of a break in the chassis line.

14. In a lubricating system for a motor vehicle, the combination with an engine sump having an oil pump therein, of a lubricant distributing system communicating with said pump and having restricted flow proportioning outlets emitting continuously under pump pressure to the chassis bearings, and means near the inlet of said distributing system, imposing flow resistance, thereby to safeguard the pump from draining the engine sump in the event of a break in the chassis line.

15. A continuous feed lubricating system for a mechanism of the type including bearings requiring flood oiling and other bearings requiring drip oiling, said system comprising a single source of lubricant pressure feeding all of said bearings, a distributing system of relatively low resistance to flow delivering oil at substantial rate from the source to the flood lubricated bearings, a distributing system of high resistance to flow leading to the bearings requiring drip oiling, said latter system including flow proportioning restriction outlets to the bearings, and a flow controlling inlet to said system substantially determining the rate of admission thereto.

16. In a mechanism of the type including bearings requiring flood oiling and other bearings requiring drip oiling, a common source of oil and of pressure for both said classes of bearings, means connecting said pressure source for emission to the flood oiled bearings, a branched distributing conduit system leading from said source to said drip oiled bearings, said system having restricted flow proportioning outlets and a highly resistant flow obstruction at the inlet to said latter system substantially determining the rate of admission thereto.

17. In a mechanism of the type comprising bearings requiring flood lubrication, a lubricant pump, a source of lubricant supply therefor, a distributing system supplied therefrom and furnishing such lubrication, said mechanism having secondary bearings requiring little lubrication; the combination therewith of means for lubricating said secondary bearings from said pump and source of supply, said means comprising a distributing system leading from said pump to said secondary bearings, flow proportioning restrictions in the branches of said system, and means substantially determining the total rate of supply of oil from said pump to said secondary bearings, said means comprising a flow resistant control element interposed between the pump and the inlet to said distributing system, all parts of said control element being fixed throughout operation.

18. A distributing system for liquid of the character subject to wide change in viscosity with change in temperature, said system including a plurality of distributed outlets under conditions of varying temperature, and feed rate control means restricting the flow of lubricant and governing the aggregate inflow to the system at more nearly constant temperature, the restricting effect of said control means being substantially greater than that of each outlet singly and of the entire distributing system therebeyond collectively.

19. A centralized lubricating system for a mechanism of the type, some of the parts of which are subject to wide fluctuations in temperature and some parts associated with which are subject to relatively smaller temperature variations, the combination therewith of a source of lubricant pressure, a distributing system leading from said source to said various bearings and having flow proportioning restrictions therein, means for minimizing the variation in lubricant flow to the bearings due to temperature changes, said means comprising an automatic control unit in the line of and restricting the flow from the source to the distributing system and subject to change in feed with change of temperature, said control unit being at the region where the temperature variation is relatively small, said flow proportioning restrictions having a substantially greater restricting effect than the distribution system or the bearings so that they will have a predominating influence in proportioning the lubricant among the bearings and said automatic control unit having a restricting effect substantially greater than the restricting effect of said flow proportioning restrictions.

20. A centralized lubricating system for a mechanism of the type, some of the parts of which are subject to wide fluctuations in temperature and some parts associated with which are subject to relatively smaller temperature variations; the combination of a source of lubricant pressure, a distributing system from said source to said various bearings and having flow proportioning restrictions therein, means for minimizing the variation in lubricant flow to the bearings due to temperature changes, said means comprising a controlling restriction element in the line of flow from the pump to the distributing system, and of order of resistance to flow higher than that of said system, said controlling restriction element being at the region where the temperature variation is relatively small.

21. In a mechanism of the type comprising bearings at parts maintained at relatively lower temperature and subject to wide temperature fluctuations, said mechanism also having a part maintained at a relatively higher temperature the combination therewith of a lubricating system including a source of pressure, a distributing system having branched outlets leading to said various bearings, and means for minimizing the great reduction in lubricant feed with fall of temperature, said means comprising a restriction element interposed between the source and the distributing system and of resistance to flow high compared to that of said distributing system and subjected to the temperature of said part at higher temperature.

22. A central lubricating system for chassis bearings comprising a pump inter-related with the operating vehicle to be continuously driven thereby, a lubricant distributing system supplied from said pump and leading to said bearings, means proportioning the division of lubricant among said bearings, and means minimizing the variations in rate of lubricant feed with variation in atmospheric temperature, said means comprising a flow obstructing element passing the lubricant from the pump to the distributing branches, said element being of resistance to flow predominating with respect to that of the distributing system therebeyond, said element being disposed at a part of the vehicle, subjected to ranges of temperature variation less than that of the external atmosphere.

23. A central lubricating system for chassis bearings comprising a pump inter-related with the operating vehicle to be continuously driven thereby, a lubricant distributing system supplied from said pump and leading to said bearings, means proportioning the division of lubricant among said bearings, and means minimizing the variations in rate of lubricant feed with variation in atmospheric temperature, said means comprising a flow obstructing element passing the lubricant from the pump to the distributing branches, said element being of resistance to flow predominating with respect to that of the distributing system therebeyond, said element being disposed at a part of the vehicle at temperature higher than atmospheric, and subject to variation less than that of atmospheric temperature.

24. A central lubricating system for chassis bearings comprising a pressure pump inter-related with the operating vehicle to be continuously driven thereby, a lubricant distributing system supplied from said pump and leading to said bearings, means proportioning the division of lubricant among said bearings, and means minimizing the variations in rate of lubricant feed with variation in atmospheric temperature, said means comprising a flow obstructing element of resistance to flow greater than that of said distributing system and passing the lubricant from the pump to said system, said element being disposed at a part of the vehicle at temperature higher than atmospheric.

25. A central lubricating system for chassis bearings comprising a pump inter-related with the operating vehicle, to be continuously driven thereby, a lubricant distributing system supplied from said pump and leading to said bearings, means near said bearings proportioning the division of lubricant thereto, and means minimizing the variations in absolute rate of lubricant feed to said system with variation in atmospheric temperature, said means comprising a flow obstructing element of high resistance to flow, passing the lubricant from the pump to the distributing branches, and disposed at a part of the vehicle at temperature intermediate between summer and oil charring temperatures.

26. In a chassis lubricating system, the combination of an oil pump, means interrelating the pump with the operating vehicle for substantially continuous operation thereof, and means limiting the output of said pump to the chassis system substantially to requirements, said means comprising a unit of high resistance to flow disposed in heat interchange relation with respect to the engine, said unit having means for connection thereto of the inlet of a distributing system.

27. A lubricating system for chassis bearings including an engine oil pump, a distributing conduit having branches leading to said bearings, flow proportioning restrictions in said branches and a master control element fixed at the water jacket of the engine, and subjected to the temperature thereof, having an inlet connected to the oil pump and an outlet to which said distributing conduit is connected, said element retarding the flow from said pump to said distributing conduit.

28. A lubricating system for chassis bearings associated with a vehicle of the type having an engine with an oil sump and a pressure oiling system including an engine oil pump; the combination therewith of a distributing system leading from said pump and having outlet branches to said chassis bearings, flow proportioning means in said branches, and a flow rate determining element, governing the inflow from said pump to said chassis system, said element being disposed in heat interchange relation with a part heated by the engine.

29. A lubricating system for chassis bearings associated with a vehicle of the type including an engine structure having a pressure oiling system including an oil sump, having a rotary oil pump therein; the combination therewith of a distributing system leading from said pump and having outlet branches to said bearings, flow proportioning means in said branches, and a flow rate determining element, governing the inflow from said pump to said chassis system, said element being of predominating resistance to flow compared to that of the distributing system and being attached to a portion of the engine structure which is maintained at a high relatively constant temperature.

30. A central lubricating system having flow proportioning outlet branches of substantial resistance to flow, a control resistance governing the inflow to the system and affording a highly restricted flow passage of resistance to flow much higher than that of said branches therebeyond and flow resistant intercepting means in the path of flow from the source of pressure to the control resistance to exclude from the latter any solid particles entrained with the oil.

31. A centralized lubricant distributing system for a series of bearings comprising a source of continuous pressure, a master flow resistance supplied therefrom, a distributing system supplied from said master resistance and having branches leading to said bearings, flow proportioning restrictions in said branches, and a filter protecting the inlet to said master element.

32. In a centralized lubricating system, the combination of a source of lubricant pressure, a distributing conduit supplied therefrom and having outlet branches to various bearings, flow restriction units in said branches of calibrated substantially invariant resistance to flow and a control restriction unit near said pump, passing the lubricant to the distributing system, said unit of resistance to flow substantially fixed and invariant and of higher order than that of said outlets, and filter means protecting said control resistance.

33. A centralized lubricant distributing system for a plurality of bearings comprising a source of continuous pressure, a master control lubricant flow restricting element supplied therefrom, a distributing system supplied from said control element and having branches leading to the bearings to be lubricated, flow proportioning restrictions in said branches, a filter protecting the inlet to said control element, said proportioning restrictions having strainer means at the respective inlets thereof.

34. A central lubricating system having flow proportioning outlet branches of high resistance to flow, a controlling resistance governing the inflow to the branches and affording a flow passage of resistance to flow much higher than that of the branches therebeyond, and intercepting means in the path of flow from the source of pressure to the control resistance to exclude from the latter any solid particles entrained with the oil, said means embodying a dense filter, a settling chamber extending below said filter and provided with an inlet feeding into the chamber from below said filter.

35. A central lubricating system having flow proportioning outlet branches of high resistance to flow, a source of oil pressure, a controlling resistance governing the inflow to the branches and affording a highly restricted flow passage, and intercepting means in the path of flow from the source of pressure to the control resistance to exclude from the latter any solid particles entrained with the oil, said means embodying a dense filter, a settling chamber extending below said filter and provided with an inlet feeding into the chamber from below said filter, said settling chamber and filter being readily removable for service thereof.

36. A chassis lubricating system comprising a pump, a master control flow resistance unit supplied therefrom, a distributing conduit system connected to said unit and having outlet branches calibrated for flow proportioning, a settling chamber in the course of flow from the pump to the master unit to allow sediment to separate out, said settling chamber having an inlet below its upper part and communicating at its upper part with said master unit, whereby air in said settling chamber will automatically be fed into and from the distributing system without trapping or compression thereof.

37. In a lubricating system, a master control unit having mounting means for applying the same at a temperature controlled region, said unit having an inlet adapted for connection to a source of pressure, and an outlet adapted for connection thereto of the head of a branched distributing system leading to various bearings, said unit imposing a throttling effect upon lubricant fed therethrough.

38. As an article of manufacture, a master plug restriction unit, comprising a cartridge having distinct depressions in the opposite ends thereof, restriction pins extending in corresponding bores in said cartridge successively from depression to depression, and means sealing the various depressions to afford a continuous path of flow in a definite sequence back and forth between the ends of the unit, to afford a restricted path of flow of length several times that of the cartridge.

39. A master automatic regulator for a central lubricating system comprising a mounting piece, a flow restriction cartridge press-fitted thereinto, said mounting piece having an inlet and an outlet both near the same end thereof, and a filter interposed in the course of flow from said inlet to said cartridge.

40. A master automatic regulator for a central lubricating system comprising a mounting piece, a flow restriction cartridge press-fitted thereinto and having an inlet and an outlet both near the same end thereof, said mounting piece affording an inlet and an outlet near the said end of said cartridge, a filter interposed in the course of flow from the main inlet to the cartridge inlet, said filter being cylindrical in construction, and a felt strainer plug interposed between said sleeve and the inlet to the cartridge.

41. An automatic master regulator for a central chassis lubricating system comprising a unit having a flow resistance therein, said unit having an inlet adapted to be connected to a source of pressure and an outlet adapted to be connected to a distributing system, a filter of large area interposed in the path of flow between the inlet and the resistance and a filter of smaller area guarding the outlet of the unit, to intercept any particles entrained by reverse flow.

42. In a central lubricating system, an automatic master regulator comprising a unit having an inlet, an outlet, a flow restriction between said inlet and said outlet, a filter between said inlet and said restriction, and a guarding filter interposed between the filter and the inlet to the restriction.

43. In a central lubricating system, an automatic master regulator comprising a unit having an inlet, an outlet, a flow restriction between said inlet and said outlet, a filter between said inlet and said restriction, a guarding filter interposed between the filter and the inlet to the restriction and a strainer at the outlet of said regulator.

44. A master control resistance unit for a central lubricating system comprising a head having an inlet and an outlet, a resistance cartridge affixed in said head and protruding therefrom and affording a highly restricted elongated passage between said inlet and said outlet and a dirt intercepter carried by said head and interposed in the course of flow from said inlet to said resistance unit.

45. An automatic master control unit comprising the combination of a plug element closed at its extremity and having a controlling flow restriction longitudinally therein, an inlet and an outlet to said plug, a filter in the path of flow from said inlet to said flow restriction and a cap removably applied to said plug and having said filter housed therein.

46. An automatic master control unit comprising the combination of a plug element closed at its extremity and having a controlling flow restriction longitudinally therein, an inlet and an outlet laterally of said unit, and a filter mounted upon said unit and in the path of flow from said inlet to said flow restriction.

47. A centralized lubricating system comprising a source of unclean oil, means applying pressure to said oil, a distributing system, a dense filter and flow restriction means interposed between the source and the distributing system, flow proportioning outlets in the various branches of the distributing system and strainers at said various outlets to guard the latter from solid particles entrained by the filtered oil in the distributing pipes.

48. A centralized lubricating system comprising a source of used lubricating oil having solid impurities therein, a branched distributing system supplied therefrom, a dense filter and flow restriction means at the inlet to said distributing system, a pump forcing oil through said filter into said system, and drip plug outlets in the branches of said system, each of said outlets having a disk of wire mesh strainer material at the inlet end thereof.

49. In a continuous-flow central lubricating system, the combination of a master control element of high resistance to flow, a distributing system supplied therefrom having calibrated resistance outlets proportioned to the requirements of the corresponding bearings, means protecting said distributing system and its master control resistance from becoming deranged by solid particles in the oil, said means comprising a cleansing unit in the path of flow from the source of pressure to the control unit, said cleansing unit including a settling chamber into which the oil is pumped, and a dense replaceable unit at the upper part of said chamber, a head mounting said chamber and means within said chamber urging said filter unit against said head.

50. A central lubricating installation for the chassis bearings of an automobile vehicle provided with an engine having a plurality of bearings, a crank case lubricant reservoir, an engine lubricating pressure pump therein and a distributing conduit system supplied from said engine pump leading to said engine bearings, said installation including a branched piping system with a plurality of metering outlets to the chassis bearings readily deranged by dirt particles and constructed to be fed at pressures less than that of the engine pump, and means to connect the pump to said piping system, to reduce the pump pressure and to cleanse the lubricant including a mounting head, a settling chamber removably fixed to said head and depending therefrom, a metal follower within said chamber, a heavy coil spring urging said follower upward, means limiting the upward movement of said follower, a removable filter unit within the upper part of said chamber, and urged by said spring propelled follower into snug contact with said head, an inlet through said head to said chamber, and an outlet from said filter through said head.

51. A central lubricating installation for the chassis bearings of an automobile vehicle provided with an engine having a plurality of bearings, a crank case lubricant reservoir, an engine lubricating pressure pump therein and a distributing conduit system supplied from said engine pump leading to said engine bearings, said installation including a branched piping system with a plurality of metering outlets to the chassis bearings readily deranged by dirt particles and constructed to be fed at pressure less than that of the engine pump, and means to connect the pump to said piping system, to reduce the pump pressure and to cleanse the lubricant including a head having a lubricant inlet and a lubricant outlet, a spring-urged valve to shut off communication between said inlet and said outlet, a settling chamber releasably attached at its rim to depend from said head, a metal follower within said chamber, a heavy coil spring reacting against the bottom of said shell and urging said follower upward, means in said shell limiting the upward movement of said follower, a dense filter unit removably disposed in the upper part of said shell and urged by said spring-pressed follower into snug engagement with said head, said filter unit having a part engaging and unseating said valve when the constituent elements of said combined unit are correctly correlated.

52. A central lubricating installation for the chassis bearings of an automobile vehicle provided with an engine having a plurality of bearings, a crank case lubricant reservoir, an engine lubricating pressure pump therein and a distributing conduit system supplied from said engine pump leading to said engine bearings, said installation including a branched piping system with a plurality of metering outlets to the chassis bearings readily deranged by dirt particles and constructed to be fed at pressures less than that of the engine pump, and means to connect the pump to said piping system, to reduce the pump pressure and to cleanse the lubricant including the combination of a head having an inlet and an outlet, a spring-seated valve in said head, shutting off communication between said elements, a settling chamber shell releasably secured at its rim to said head, to depend therefrom, a spring-pressed follower within the lower part of said shell limiting its upward movement, a dense cylindrical filter unit having a compact filtering upper surface urged by said spring-pressed follower into firm engagement with said head, said filter unit having an extension adapted to coact with said valve to unseat the latter when the parts are correctly positioned.

53. A central lubricating installation for the chassis bearings of an automobile vehicle provided with an engine having a plurality of bearings, a crank case lubricant reservoir, an engine lubricating pressure pump therein and a distributing conduit system supplied from said engine pump leading to said engine bearings, said installation including a branched piping system with a plurality of metering outlets to the chassis bearings readily deranged by dirt particles and constructed to be fed at pressures less than that of the engine pump, and means to connect the pump to said piping system, to reduce the pump pressure and to cleanse the lubricant including the combination of a head having a tapped socket, a settling chamber shell having a threaded rim adapted to be screwed into said socket, said shell having a follower therein, a heavy coil spring urging said follower upward and stop means limiting said follower, a removable dense filter cylinder having a metal core, and disposed within the upper part of said shell, whereby in the application of said shell to the head, the follower becomes depressed to stress the spring and urge the filter into intimate contact with the head, said unit having an outlet through its head supplied from said intimate surface of contact.

54. A central lubricating installation for the chassis bearings of an automobile vehicle provided with an engine having a plurality of bearings, a crank case lubricant reservoir, an engine lubricating pressure pump therein and a distributing conduit system supplied from said engine pump leading to said engine bearings, said installation including a branched piping system with a plurality of metering outlets to the chassis bearings readily deranged by dirt particles and constructed to be fed at pressures less than that of the engine pump, and means to connect the pump to said piping system, to reduce the pump pressure and to cleanse the lubricant including the combination of a cylindrical dense filter element, an assembly including an internally notched metal plate, a perforated metal plate thereover, a perforated cover plate of highly compacted felt, a capsule enclosing said elements, a metal hub extending axially through said filter with clearance and axially through said assembly, and metal reaction pieces at opposite ends of said filter, the ends of said metal hub being crimped over the respective metal pieces to complete the filter assembly.

55. A central lubricating installation for the chassis bearings of an automobile vehicle provided with an engine having a plurality of bearings, a crank case lubricant reservoir, an engine lubricating pressure pump therein and a distributing conduit system supplied from said engine pump leading to said engine bearings, said installation including a branched piping system with a plurality of metering outlets to the chassis bearings readily deranged by dirt particles and constructed to be fed at pressures less than that of the engine pump, and means to connect the pump to said piping system, to reduce the pump pressure and to cleanse the lubricant including the combination of a highly restricted flow controlling unit embodying a plurality of rigid pins extending with small clearance through corresponding bores to impose high resistance to flow, the inlet ends of said bores being rounded for the purpose described.

56. The method of supplying oil at rate varying within but relatively narrow limits through one or more flow resistant paths varying widely in temperature, from a source of pressure which is roughly constant, which method consists in obstructing the out-flow from the source of pressure to a dominating degree, while maintaining the oil during such obstructed flow under nearly invariant viscosity conditions.

57. The method of feeding lubricant of varying viscosity at nearly constant rate through a restricted outlet by propulsion from a source of pressure inherently feeding at reduced rate with increase of flow resistance, which method consists in highly obstructing the course of flow from the source of pressure to a degree which is dominant under all operating conditions, while maintaining the lubricant during its said obstructed flow at nearly constant viscosity.

58. The method of chassis lubrication at nearly constant rate of feed from a source of pressure inherently feeding at reduced rate with increase of flow resistance, which method consists in heating the lubricant near the source of pressure to a degree such as to maintain approximate constancy of viscosity thereof at that region while obstructing the lubricant flow at the heated region to such degree as substantially to determine the rate of feed under various conditions of flow resistance in the chassis flow lines therebeyond.

59. The method of adapting a source of lubricant pressure designed for other purposes to bring about substantially constant rate of feed through a distributing system of the drip plug type which consists in absorbing most of the pressure at the inlet to the system under favorable conditions of lubrication.

60. A central lubricating installation for the chassis bearings of an automobile vehicle provided with an engine having a plurality of bearings, a crank case lubricant reservoir, an engine lubricating pressure pump therein and a distributing conduit system supplied from said engine pump leading to said engine bearings, said installation including a branched piping system with a plurality of metering outlets to the chassis bearings readily deranged by dirt particles and constructed to be fed at pressures less than that of the engine pump, and means to connect the pump to said piping system, to reduce the pump pressure and to cleanse the lubricant including a settling chamber intervening between said source and said bearings, inlet means supplying said settling chamber from said pump, said settling chamber being constructed and arranged to maintain its contents heated and substantially quiescent during operation for settling out much of the solid content of the oil.

61. A central lubricating installation for the chassis bearings of an automobile vehicle provided with an engine having a plurality of bearings, a crank case lubricant reservoir, an engine lubricating pressure pump therein and a distributing conduit system supplied from said engine pump leading to said engine bearings, said installation including a branched piping system with a plurality of metering outlets to the chassis bearings readily deranged by dirt particles and constructed to be fed at pressures less than that of the engine pump, and means to connect the pump to said piping system, to reduce the pump pressure and to cleanse the lubricant including a settling chamber in the course of feed to the chassis bearings, means greatly retarding the flow rate through said settling chamber, so that the contents thereof remain in substantially quiescent condition, said settling chamber being subjected to heat from a power generating part of the vehicle.

62. A central chassis lubricating system of the type using dirty engine oil propelled under pressure from the crankcase, said system including branched conduits, means retarding the rate of pressure feed to the bearings to substantially current needs of the chassis bearings, said means including flow controlling restrictions in the branches to the respective bearings, a settling chamber of diameter much larger than that of said conduits and disposed in the course of feed to the branched system, said settling chamber constructed and arranged to be maintained under nearly uniform temperature to avoid convection currents therein and thereby to permit settling out of solids in the oil.

63. A central chassis lubricating system of the type using dirty engine oil from the crankcase, said system comprising a settling chamber in the course of feed from the crank case to the chassis bearings, subjected to heat from the running engine and having an outlet near the top thereof leading to the chassis bearings, a dense filter near said outlet for intercepting solids remaining in the oil, and flow controlling restrictions in the course of flow to the chassis bearings, imposing a flow obstruction far greater than that due to said filter, and retarding the flow through said settling chamber, so that the contents thereof remain in substantially quiescent condition.

64. The method of lubricating an automobile chassis with oil derived from the crankcase, which consists in propelling the oil from the crankcase to the chassis bearings at the extremely slow rate corresponding to current requirements of the chassis bearings, while settling out solid particles from the slowly feeding oil at a heated region in the course of flow from the agitated crankcase contents.

65. A central lubricating installation for bearings of an automotive vehicle which require relatively small amounts of lubricant as compared to the main bearings of the motor thereof, said motor being provided with a lubricant pump and said installation comprising a distribution system with branches having flow metering outlets proportioning the lubricant among said bearings at predetermined pressures, a connection between the inlet of said system and the pump and means upon said connection to reduce the pressure of said lubricant pump upon said system to said predetermined pressures.

66. A central lubricating installation for bearings of an automotive vehicle which require relatively small amounts of lubricant as compared to the main bearings of the motor thereof, said motor being provided with a lubricant pump and said installation comprising a distribution system with branches having flow metering outlets proportioning the lubricant among said bearings at predetermined pressures, a connection between the inlet of said system and the pump and means upon said connection to reduce the pressure of said lubricant pump upon said system to said predetermined pressures, said pressure reducing means including a flow restriction attached to the engine structure.

67. A central lubricating installation for bearings of an automotive vehicle which require relatively small amounts of lubricant as compared to the main bearings of the motor thereof, said motor being provided with a lubricant pump and said installation comprising a distribution system with branches having flow metering outlets proportioning the lubricant among said bearings at predetermined pressures, a connection between the inlet of said system and the pump and means upon said connection to reduce the pressure of said lubricant pump upon said system to said predetermined pressures, said flow restriction and said flow metering outlets being formed by plugging portions of the connection and the distribution system.

68. A central lubricating installation for bearings of an automotive vehicle which require relatively small amounts of lubricant as compared to the main bearings of the motor thereof, said motor being provided with a lubricant pump and said installation comprising a distribution system with branches having flow metering outlets proportioning the lubricant among said bearings at predetermined pressures, a connection between the inlet of said system and the pump and means upon said connection to reduce the pressure of said lubricant pump upon said system to said predetermined pressures, said pressure reducing means and said metering outlets being each preceded by filter devices.

69. A central lubricating installation for bearings of an automotive vehicle which require relatively small amounts of lubricant as compared to the main bearings of the motor thereof, said motor being provided with a lubricant pump and said installation comprising a distribution system with branches having flow metering outlets proportioning the lubricant among said bearings at predetermined pressures, a connection between the inlet of said system and the pump and means upon said connection to reduce the pressure of said lubricant pump upon said system to said predetermined pressures, said pressure reducing means including a casting attached to the motor body provided with a depending threaded skirt, a valve chamber, threaded inlet and outlet connections adjacent the top of the casting, a restriction chamber accessible from the outside of the casting and bores leading from the inlet to within the skirt, from within the skirt to the restriction chamber and from said restriction chamber to said outlet, said valve chamber being also placed in communication by said bores with said inlet and said outlet; a threaded cup cooperating with said threaded skirt to form a closed chamber adjacent the bottom of the casting communicating with said bores leading to within and from within said skirt with a tool-engaging projection at the lower end thereof; an annular filter member so arranged in respect to the bores leading to within and from within the skirt that all lubricant passing through said chamber between said bores must pass therethrough, the center portion of said filter communicating with said second mentioned bore; a central metallic rod extending entirely through said filter and supporting it within said chamber; a spring pressed valve in said valve chamber; a restriction plug in said restriction chamber projecting outside of the casting; said bores being so arranged as to pass the lubricant through said filter and past said valve before it passes said restriction plug.

70. In combination with a mechanism having a plurality of bearings to be lubricated and a source of lubricant pressure, a branched lubricant conduit system with a single inlet end and a plurality of outlet ends comprising a piping arrangement and restriction proportioning devices at all of said ends of said piping arrangement, one of said restriction devices being connected at the inlet end to the source of lubricant pressure and passing lubricant inwardly to the piping arrangement and the other restriction devices at the outlet ends dispensing it to the bearings to be lubricated, said restriction devices being of much greater lubricant flow retarding effect than the conduit system and the bearings.

71. In combination with a mechanism having a plurality of bearings to be lubricated and a source of lubricant pressure, a branched lubricant conduit system with a single inlet end and a plurality of outlet ends comprising a piping arrangement and restriction proportioning devices at all of said ends of said piping arrangement, one of said restriction devices being connected at the inlet end to the source of lubricant pressure and passing lubricant inwardly to the piping arrangement and the other restriction devices at the outlet ends dispensing it to the bearings to be lubricated, said restriction devices being of much greater lubricant flow retarding effect than the conduit system and the bearings, and lubricant cleansing means being provided adjacent to the inlet restriction and both ahead of and following said inlet restriction and adjacent and ahead of the outlet restrictions.

72. In combination with a mechanism having a plurality of bearings to be lubricated and a source of lubricant pressure, a branched lubricant conduit system with a single inlet end and a plurality of outlet ends comprising a piping arrangement and restriction proportioning devices at all of said ends of said piping arrangement, one of said restriction devices being connected at the inlet end to the source of lubricant pressure and passing lubricant inwardly to the piping arrangement and the other restriction devices at the outlet ends dispensing it to the bearings to be lubricated, such restriction devices being of much greater lubricant flow retarding effect than the conduit system and the bearings, and valves being positioned at the inlet and outlet restriction devices.

73. In a centralized lubricating system for automotive vehicles, said system supplying bearings to be lubricated which are located on the chassis and exposed to atmospheric temperatures, the combination of a plurality of bearings to be lubricated, lubricant flow resistance units located adjacent said bearings, a conduit system connecting said units, a pump capable of discharging lubricant under high pressure, a regulating device positioned in a portion of said vehicle which is maintained at substantially constant temperature and receiving lubricant from said pump, said device including a passageway offering substantial resistance to the flow of lubricant therethrough, and means for connecting said device to said conduit system, said flow resistance units having a restricting effect substantially greater than is encountered in the conduit system and in the bearings, whereby they will have a predominating influence upon the proportioning of lubricant among the bearings and said regulating device having a substantially greater restricting effect than said flow resistance units.

74. In a centralized lubricating system for an automobile having a water jacket, a lubricant pump, a common conduit connected to said pump for supplying lubricant to a conduit system connected to parts to be lubricated, a resistance unit in said common conduit and receiving heat from and being located on said water jacket whereby the lubricant is maintained at substantially constant temperature, a plurality of bearings to be lubricated, and a conduit system connecting said bearings with said resistance unit.

75. In an automotive vehicle of the type including a chassis frame having a plurality of spaced bearings to be lubricated continuously throughout the operation of the automobile and an engine supported upon said chassis for operating the automobile, said engine being provided with a circulating water system for preventing excessive rise of temperature of the engine during operation thereof, said circulating water system including a water jacket for the engine structure; the combination therewith of a central chassis lubricating installation comprising a central reservoir and pump unit automatically actuated upon operation of the automotive vehicle, a branched distributing piping extending along the chassis frame and having flow controlling resistance units connected to the chassis bearings to be lubricated to determine the supply of lubricant to each of said chassis bearings, said piping being provided with a single inlet and a connection between said single inlet and said pump including a flow resistance unit, said resistance unit limiting the flow of oil from said pump into said piping, and having a restricting effect substantially greater than the restricting effect of said flow controlling resistance units connected to the chassis bearings.

76. In an automotive vehicle of the type including a chassis frame having a plurality of spaced bearings to be lubricated continuously throughout the operation of the automobile and an engine supported upon said chassis for operating the automobile, said engine being provided with a circulating water system for preventing excessive rise of temperature of the engine during operation thereof, said circulating water system including a water jacket for the engine structure; the combination therewith of a central chassis lubricating installation comprising a central reservoir and pump unit automatically actuated upon operation of the automotive vehicle, a branched distributing piping extending along the chassis frame and having flow controlling resistance units connected to the chassis bearings to be lubricated to determine the supply of lubricant to each of said chassis bearings, said piping being provided with a single inlet and a connection between said single inlet and said pump including a flow resistance unit, said resistance unit limiting the flow of oil from said pump into said piping, and said resistance unit being positioned in said water jacket and being maintained at an elevated temperature by said circulating water from said water jacket, whereby a uniform flow of lubricant to the bearings will occur without being too greatly affected by external atmospheric temperature.

77. In an automotive vehicle of the type including a chassis frame having a plurality of spaced bearings to be lubricated continuously throughout the operation of the automobile and an engine supported upon said chassis for operating the automobile, said engine being provided with a circulating water system for preventing excessive rise of temperature of the engine during operation thereof, said circulating water system including a water jacket for the engine structure; the combination therewith of a central chassis lubricating installation comprising a central reservoir and pump unit automatically actuated upon operation of the automotive vehicle, a branched distributing piping extending along the chassis frame and having flow controlling resistance drip plug outlets connected to the chassis bearings to be lubricated to determine the supply of lubricant to each of said chassis bearings, said piping being provided with a single inlet and a connection between said single inlet and said pump including a flow resistance unit, said last-mentioned resistance unit limiting the flow of oil from said pump into said piping, and consisting of a cartridge unit provided with a passageway substantially filled by a metallic plug means, whereby an elongated resistance passage of very high resistance will be formed, said cartridge unit fitting into said water jacket, whereby it will be maintained at relatively elevated temperature by the circulating water therein.

78. In a central lubricating installation for a mechanism having a plurality of spaced bearings, a central lubricant reservoir, an automatically actuated central pump of excessive lubricant delivery capacity over and above the requirements of said bearings receiving lubricant from said reservoir, and a branched distributing piping system having a single inlet from said pump and a plurality of outlets to said bearings, said outlets respectively including invariant high resistance flow controlling and proportioning drip plug outlets of diverse flow rate capacities and said inlet including an invariant flow controlling and proportioning resistance device of an order of resistance much higher than the combined resistances of said drip plug outlets to limit the flow into said inlet to bearing requirements.

79. In a central lubricating installation for a mechanism having a plurality of spaced bearings, a central lubricant reservoir, an automatically actuated central pump of excessive lubricant delivery capacity over and above the requirements of said bearings receiving lubricant from said reservoir, and a branched distributing piping system having a single inlet from said pump and a plurality of outlets to said bearings, said outlets respectively including invariant high resistance flow controlling and proportioning drip plug outlets of diverse flow rate capacities and said inlet including an invariant flow controlling and proportioning resistance device of an order of resistance much higher than the combined resistances of said drip plug outlets to limit the flow into said inlet to bearing requirements, said drip plug outlets being normally at relatively varying outdoor atmospheric temperatures, and said inlet device being provided with means to maintain it at a relatively elevated more nearly constant temperature.

80. A central lubricating system for a vehicle comprising a series of bearing surfaces, a series of branch conduits to supply lubricant to said bearing surfaces, a series of main conduits to supply said lubricant branch conduits, means to place a pressure upon the lubricant in said conduits adjacent the inlet to said system during operation of the vehicle, outlet control means to maintain said conduits filled with oil when said pressure is not applied, to resist the discharge caused by the pressure means and to compel a slow dispensation of the lubricant to the bearing surfaces, a flow resistance at said inlet, and means to reduce the viscosity of said lubricant at said resistance, said outlet control means and said flow resistance being connected in series, and said flow resistance having a substantially greater resistance to flow than said outlet control means.

81. A central lubricating system of a vehicle comprising a series of bearing surfaces, a series of branch conduits to supply lubricant to said bearing surfaces, a series of main conduits adapted to supply said branch lubricant conduits, means to place a pressure periodically upon the lubricant in said conduits adjacent the inlet to said system, outlet control means to maintain said conduits filled with oil when said pressure is not applied, to resist the discharge caused by the pressure means and to compel a slow dispensation of the lubricant to the bearing surfaces, a flow resistance at said inlet and means to heat said lubricant at said inlet to a temperature higher than atmosphere, said outlet control means and said inlet flow resistance including elongated passageways of minute cross section connected in series, said inlet resistance having a substantially greater length of passageway than said outlet control means.

82. A central lubrication installation for an automobile chassis with a multiplicity of bearings comprising a pump, a distributing conduit system with restricted outlet passages leading to said bearings and an inlet restriction having an elongated minute restricting passage to decrease the flow from said pump to said system, the elongated minute inlet restricting passage having less restricting effect per unit length than the restricted outlet passages but having such substantially greater length as to have a substantially greater total restricting effect.

83. A central lubrication installation for an automobile chassis with a multiplicity of bearings comprising a pump, a distributing conduit system with restricted outlet passages leading to said bearings and an inlet restriction having an elongated minute restricting passage to decrease the flow from said pump to said system, the elongated minute inlet restricting passage having less restricting effect per unit length than the restricted outlet passages but having such substantially greater length as to have a substantially greater total restricting effect, said inlet restricting passage and said restricted outlet passages consisting of pin-restricted bores.

84. A central lubricating installation for the chassis bearings of an automobile vehicle provided with an engine having a plurality of bearings, a crank case lubricant reservoir, an engine lubricating pressure pump therein and a distributing conduit system supplied from said engine pump leading to said engine bearings, said installation including a branched piping system with a plurality of metering outlets to the chassis bearings readily deranged by dirt particles and constructed to be fed at pressures less than that of the engine pump, and means to connect the pump to said piping system, to reduce the pump pressure and to cleanse the lubricant including the combination of a head having an inlet and an outlet, a spring-seated valve in said head, shutting off communication between said elements, a settling chamber shell releasably secured at its rim to said head, to depend therefrom, a spring-pressed follower within the lower part of said shell limiting its upward movement, a dense cylindrical filter unit having a compact filtering upper surface urged by said spring-pressed follower into firm engagement with said head, said filter unit having an extension adapted to coact with said valve to unseat the latter when the parts are correctly positioned, the filter unit having an extension at its lower part engaged by the follower and of size or form to limit application of the filter in reverse relation.

85. A lubricant distribution system comprising a lubricant supply, a source of pressure including a lubricant pump receiving lubricant from said supply, branch conduits receiving lubricant from said source of pressure and extending to points of distribution, flow controlling outlets at the points of distribution and temperature responsive means to control the lubricant pressure supplied to said distribution system from said pump, said flow controlling outlets having a substantially greater restricting effect than the branched conduits or the bearing supply, so that they will have a predominating influence in proportioning the lubricant among the bearings and said temperature-responsive means having an obstructing effect substantially greater than the restricting effect of said flow controlling outlets.

JOSEPH BIJUR.